United States Patent
Strein et al.

(10) Patent No.: US 10,567,847 B2
(45) Date of Patent: Feb. 18, 2020

(54) SYSTEMS AND METHODS FOR TRANSPORTING AND RETAINING VIDEO HEADER INFORMATION FOR VIDEO CONTENT

(71) Applicant: Disney Enterprises, Inc., Burbank, CA (US)

(72) Inventors: Michael Strein, New York, NY (US); Vladislav Feldman, Manhasset Hills, NY (US); Craig Beardsley, Chicago, IL (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 15/290,944

(22) Filed: Oct. 11, 2016

(65) Prior Publication Data
US 2018/0103301 A1  Apr. 12, 2018

(51) Int. Cl.
| | |
|---|---|
| H04N 21/234 | (2011.01) |
| H04N 21/643 | (2011.01) |
| H04N 21/434 | (2011.01) |
| H04N 21/6437 | (2011.01) |
| H04N 21/6405 | (2011.01) |
| H04N 21/435 | (2011.01) |

(52) U.S. Cl.
CPC ... *H04N 21/64322* (2013.01); *H04N 21/4342* (2013.01); *H04N 21/435* (2013.01); *H04N 21/6405* (2013.01); *H04N 21/6437* (2013.01)

(58) Field of Classification Search
CPC .................................................. H04N 21/234
USPC ................................ 725/74–104; 25/74–104
See application file for complete search history.

(56) References Cited

U.S. PATENT DOCUMENTS

| | | | |
|---|---|---|---|
| 7,012,964 B1* | 3/2006 | Nakano | H04N 9/8042 375/240.28 |
| 7,110,457 B1* | 9/2006 | Chen | H04H 20/33 375/240.25 |
| 9,077,667 B2* | 7/2015 | Sridhar | H04L 45/74 |
| 2003/0133448 A1* | 7/2003 | Frink | H04N 21/43615 370/389 |

(Continued)

OTHER PUBLICATIONS

Postel, J., *User Datagram Protocol*, RFC 768, Aug. 1980. pp. 1-3.

(Continued)

*Primary Examiner* — Mushfikh I Alam
(74) *Attorney, Agent, or Firm* — Farjami & Farjami LLP

(57) ABSTRACT

There is provided a device comprising a non-transitory memory storing an executable code, a hardware processor executing the executable code to receive Internet protocol (IP) packets encapsulating a video content, the IP packets including a frame having a header storing header information relating to the video content, retrieve at least one portion of the header information relating to the video content from the header, retrieve the video content from the IP packets, prepare the retrieved video content for transmission using serial digital interface (SDI) protocol, insert the at least one portion of the header information into at least one of a vertical ancillary (VANC) data space and a horizontal ancillary (HANC) data space of the prepared video content using the SDI protocol, and transmit the prepared video content using the SDI protocol, including the at least one portion of the header information in the VANC space.

16 Claims, 4 Drawing Sheets

(56) References Cited

U.S. PATENT DOCUMENTS

| | | | |
|---|---|---|---|
| 2006/0251112 A1* | 11/2006 | Sato | H04N 21/43632 |
| | | | 370/465 |
| 2010/0169503 A1* | 7/2010 | Kollmansberger | H04L 65/605 |
| | | | 709/231 |
| 2016/0173556 A1* | 6/2016 | Park | H04N 21/2381 |
| | | | 709/219 |
| 2016/0352801 A1* | 12/2016 | Krishna | H04L 65/80 |
| 2017/0078359 A1* | 3/2017 | Herrero | H04L 63/0428 |
| 2018/0376182 A1* | 12/2018 | Kojima | H04N 21/2343 |

OTHER PUBLICATIONS

Handley, M. *Session Announcement Protocol*, RFC 2974, Oct. 2000. pp. 1-17.

Schulzrinne, et al.. *RTP: A Transport Protocol for Real-Time Applications*, RFC 3550, Jul. 2003. pp. 1-104.

* cited by examiner

SYSTEMS AND METHODS FOR TRANSPORTING AND RETAINING VIDEO HEADER INFORMATION FOR VIDEO CONTENT

BACKGROUND

Conventional digital video systems use serial digital interface (SDI) protocol to transmit video contents. Recent advances in video technology allow digital video contents to be transmitted using Internet protocol (IP). The digital video content transmitted using IP may need to be converted into an SDI format for use with the SDI video device, and vice versa.

SUMMARY

The present disclosure is directed to systems and methods for transporting and retaining video header information for video content, substantially as shown in and/or described in connection with at least one of the figures, as set forth more completely in the claims.

DETAILED DESCRIPTION

Figure 1:
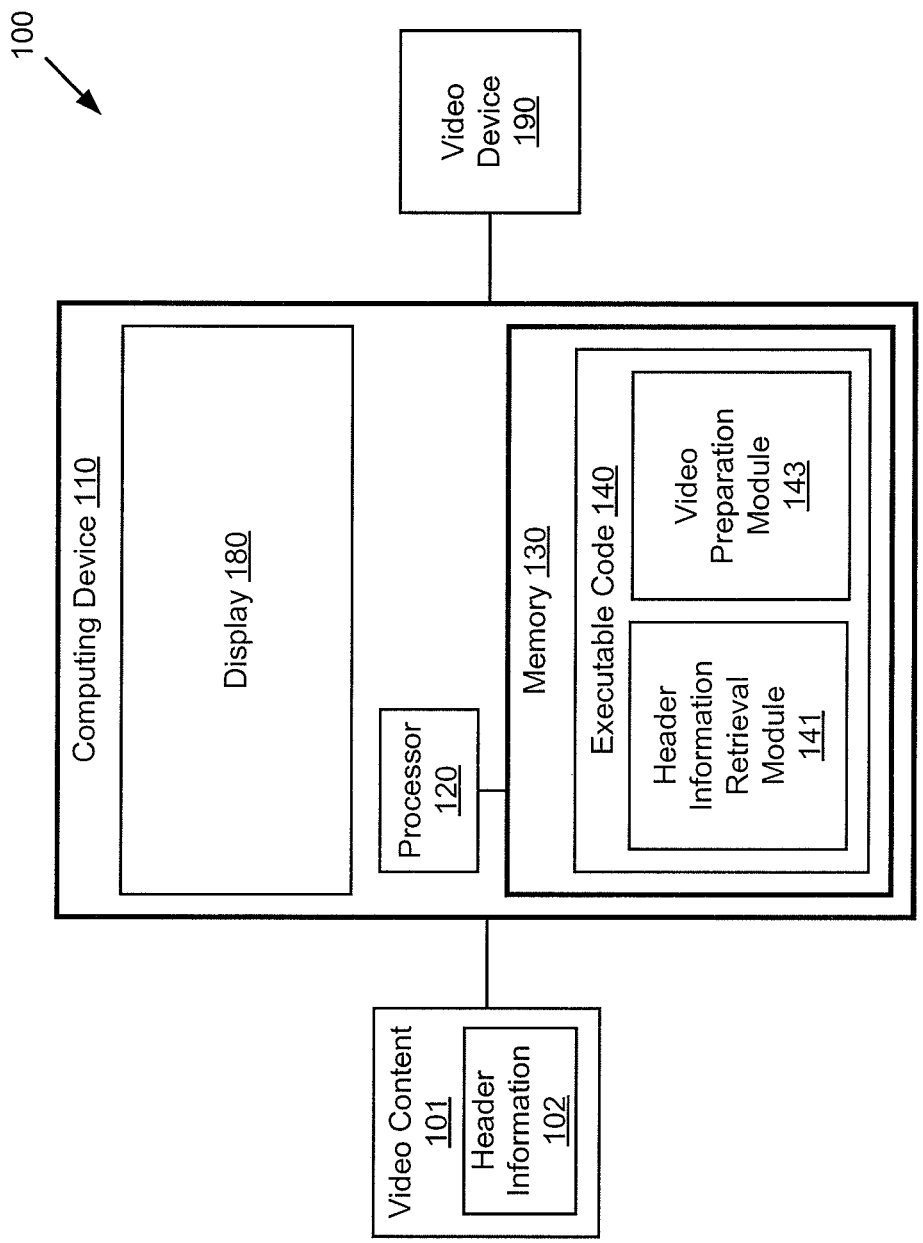
FIG. 1 shows a diagram of an exemplary system for transporting and retaining video header information for video content, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for transporting and retaining video header information for video content, according to one implementation of the present disclosure. Diagram 100 shows video content 101, computing device 110, and video device 190. Video content 101 may be a video content including a plurality of video frames. In some implementations, video content 101 may be encapsulated in one or more Internet protocol (IP) packets. Internet protocol packets may be addressed using IP version 4 (IPv4) or IP version 6 (IPv6). IPv4 is described in IETF publication RFC 791 (September 1981), and IPv6 is described in IETF publication RFC 2460 (December 1998), which are hereby incorporated by reference.

Each frame of video content 101 encapsulated in IP packets may include a header storing header information 102. In other implementations, video content 101 may be included in a serial digital interface (SDI) signal. Each frame of video content 101 in the SDI signal may include header information 102 stored in a vertical ancillary data (VANC) space. Ancillary data (commonly abbreviated as ANC data), in the context of video systems, refers to a means by which non-video information, such as audio, other forms of essence, and metadata, may be embedded within the SDI signal. Ancillary data is standardized by SMPTE as *SMPTE 291M: Ancillary Data Packet and Space Formatting*, which is incorporated herein by reference. Ancillary data can be located in non-picture portions of horizontal scan lines. This is known as horizontal ancillary data (HANC). Ancillary data can also be located in non-picture regions of the frame. Data may be stored in the VANC space by referencing Data ID's (DIDs) and Secondary Data ID's (SDIDs). SMPTE 291M allows an availability of DID/SDID combinations for user defined functions. SMPTE 291M is used for insertion of data into HDTV signals. There are also SMPTE standards for SDTV as well as UHDTV formats that may be used in various implementations disclosed herein.

Header information 102 may include information about video content 101, such as a source multicast address, a timestamp, a synchronization source (SSRC) identifier, a contributing source (CSRC) identifier, etc. In some implementations, each frame of video content 101 may include a header storing some or all of header information 102. In some implementations, header information 102 may be stored in a real-time transport protocol (RTP) header of video content 101 in an IP format, or in a data space of video content 101, such as the VANC space. Real-time transport protocols are standardized by IEFT in RFC 3550, *RTP: A Transport Protocol for Real-Time Applications*, which is incorporated herein by reference.

Computing device 110 may be a video display device, a video editing device, a video processing device, etc. In some implementations, computing device 110 may be a video device that receives video content 101 in IP packets and converts video content 101 to an SDI signal. In other implementations, computing device 110 may receive video content 101 in an SDI signal and convert video content 101 to an IP video encapsulated in IP packets. Computing device 110 may receive, convert, and transmit video content 101 and preserve header information 102, allowing video content 101 to be converted from IP format to SDI format without losing header information 102, and/or convert video content 101 from an SDI format to an IP format without losing header information 102. As shown in FIG. 1, computing device 110 includes processor 120, memory 130, and display 180. Processor 120 is a hardware processor, such as a central processing unit (CPU) found in computing devices. Memory 130 is a non-transitory storage device for storing computer code for execution by processor 120, and also for storing various data and parameters. As shown in FIG. 1, memory 130 includes executable code 140. Executable code 140 may include one or more software modules for execution by processor 120. As shown in FIG. 1, executable code 140 includes header information retrieval module 141 and video preparation module 143.

Header information retrieval module 141 is a software module stored in memory 130 for execution by processor 130 to retrieve header information 102 from video content 101. In some implementations, header information retrieval module 141 may retrieve header information 102 from video content 101. Header information retrieval module 141 may retrieve information from header information 102 related to an origination source of video content 101, such as the source multicast address, the timestamp, the SSRC identifier, the CSRC identifier, etc. Multicast addressing is standardized by IETF in RFC 2974, *Session Announcement Protocol*, which is incorporated herein by reference.

Header information retrieval module may retrieve header information from a header of the one or more frames of video content 101 encapsulated in an IP signal or the VANC space of video content 101 in an SDI signal.

Video preparation module 143 is a software module stored in memory 130 for execution by processor 120 to prepare video content 101 for transmission. Video preparation module 143 may prepare video content 101 by encapsulating the one or more frames in IP packets, preparing video content 101 using an SDI protocol, etc. In some implementations, video preparation module 143 may insert part or all of header information 102 in the prepared video content. Executable code 140 may transmit the prepared video. In one implementation, the prepared video may be transmitted for display on display 180. In other implementations, the prepared video may be transmitted to video device 190. In some implementations, video device 190 may be an IP video device, an SDI video device, etc.

Figure 2:
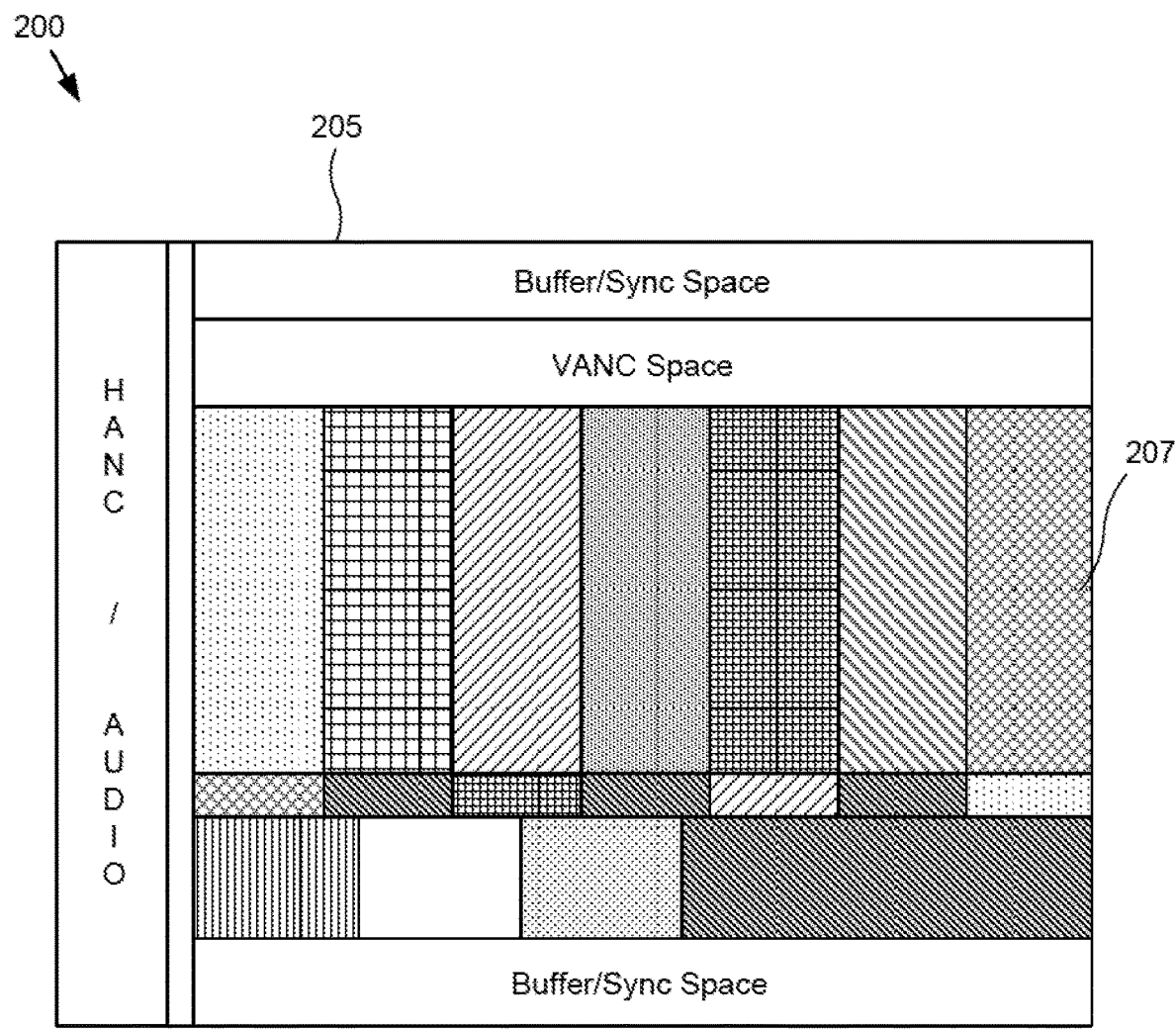
FIG. 2 shows a diagram of an exemplary video frame for use with the system of FIG. 1, according to one implementation of the present disclosure.

FIG. 2 shows a diagram of an exemplary video frame for use with the system of FIG. 1, according to one implementation of the present disclosure. Diagram 200 includes frame 205, which includes display area 207, buffer/sync space, vertical ancillary (VANC) data space, and horizontal ancillary (HANC) data/audio space. Display area 207 may be the active picture area of frame 205 where visual content is displayed, such as the portion of frame 205 that is shown on display 295. In some implementations, frame 205 may include ancillary information in the form of ancillary data packets. Ancillary data packets may be divided into two types, depending on where they are located. In some implementations, specific packet types may be constrained to be in one location or another. Ancillary packets located in the horizontal blanking region, after the end of active video but before the start of active video, regardless of line, may be known as HANC data. HANC may be used for higher-bandwidth data, and/or for data that needs to be synchronized to a particular line. In some implementations, HANC may be used to embed audio. Ancillary packets located in the vertical blanking region, and after the start of active video but before the end of active video, are VANC. In some implementations, VANC may be used for low-bandwidth data, or for data that may be updated on a per-field or per-frame rate, such as closed caption data and dynamic range data.

Figure 3:
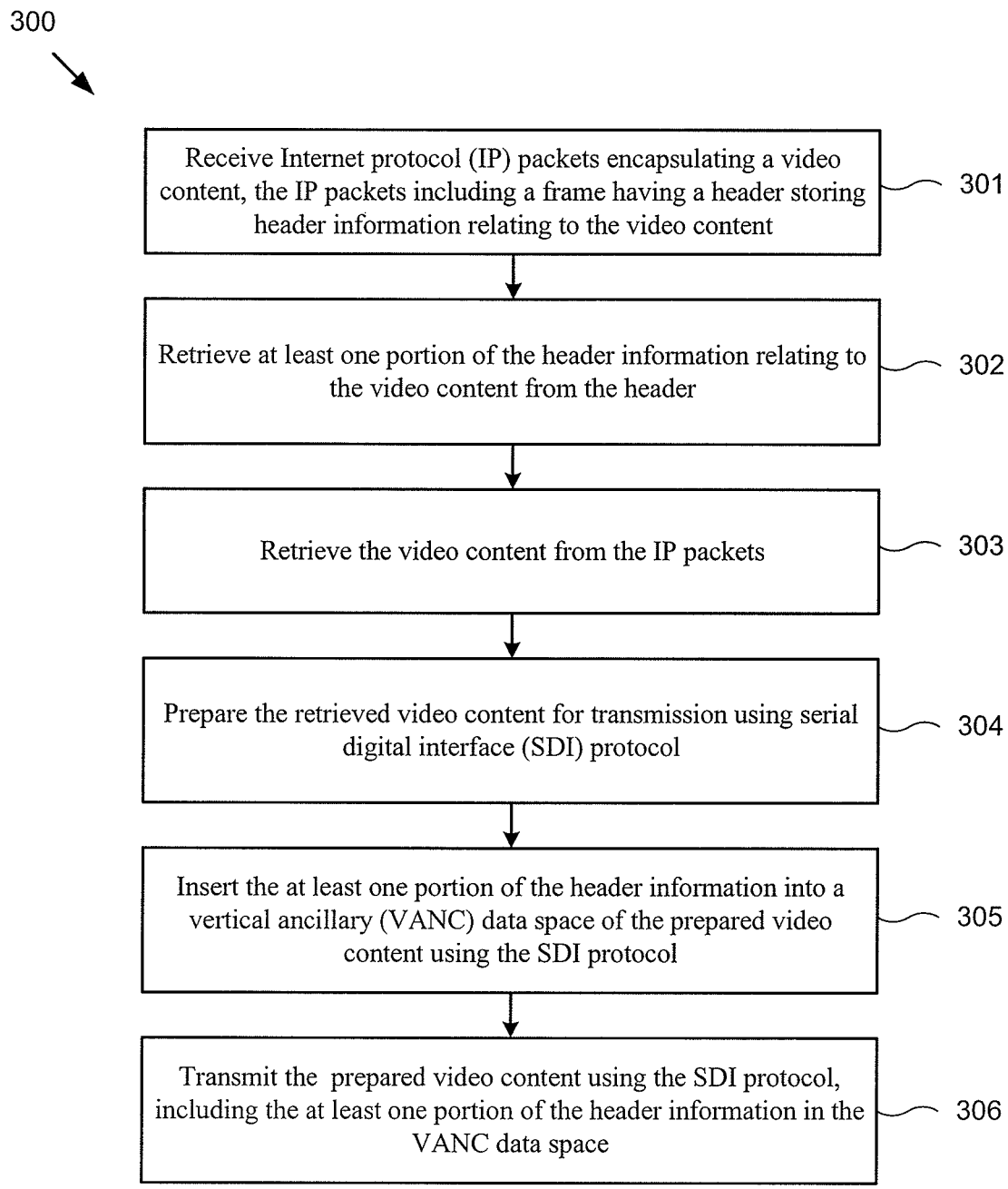
FIG. 3 shows a flowchart illustrating an exemplary method of transporting and retaining video header information for video content, according to one implementation of the present disclosure.

FIG. 3 shows a flowchart illustrating an exemplary method of transporting and retaining video header information for video content, according to one implementation of the present disclosure. Method 300 begins at 301, where executable code 140 receives Internet protocol (IP) packets encapsulating video content 101, the IP packets including a frame having a header storing header information relating to video content 101. In some implementations, computing device 110 may receive video content 101 over a computer network, such as the Internet, a local area network (LAN), a wireless local area network (WLAN), a wide area network (WAN), a metropolitan area network (MAN), a server area network (SAN), etc. In one implementation, computing device 110 may be an SDI video display device, an SDI video processing device, or a video conversion device for converting video content 101 in an IP format into video content 101 in an SDI format for transmission to an SDI video device.

At 302, executable code 140 retrieves at least one portion of the header information relating to video content 101 from the header. In some implementations, the header may be an RTP header. Header information retrieval module 141 may retrieve at least a portion of the information stored in header information 102. In some implementations, header information retrieval module 141 may retrieve one or more items of header information 102 from the header of video content 101 in the IP format, such as the source multicast address, the timestamp, the SSRC identifier, the CSRC identifier, etc. Method 300 continues at 303, where executable code 140 retrieves video content 101 from the IP packets of video content 101 in the IP format.

At 304, executable code 140 prepares the retrieved video content for transmission using SDI protocol. In some implementations, video preparation module 143 may prepare video content 101 as an SDI video having a HANC space and a VANC space. Method 300 continues at 305, where executable code 140 inserts the at least one portion of the header information into at least one of the HANC space and the VANC space of the prepared video content using the SDI protocol. Video preparation module 143 may insert the portions of header information 102 that were retrieved from the header of video content 101 in the IP format into a data space, such as the HANC space and/or the VANC space, of video content 101 in the SDI format. Inserting part or all of header information 102 into the HANC space and/or the VANC space of video content 101 in the SDI format may preserve header information 102, allowing header information 102 to be transmitted with video content 101 in the SDI format. In some implementations, this may allow video content 101 to be subsequently converted back into an IP format without losing any of header information 102.

At 306, executable code 140 transmits the prepared video content using the SDI protocol, including the at least one portion of the header information in the HANC space and/or the VANC space. In some implementations, the prepared video content may be transmitted for display on display 180. For example, computing device may be an SDI video device, and the prepared video may be shown on display 120. In other implementations, computing device 110 may be a video conversion device used to prepare the prepared video for use by video device 190, and the prepared video may be transmitted to device 190.

Figure 4:
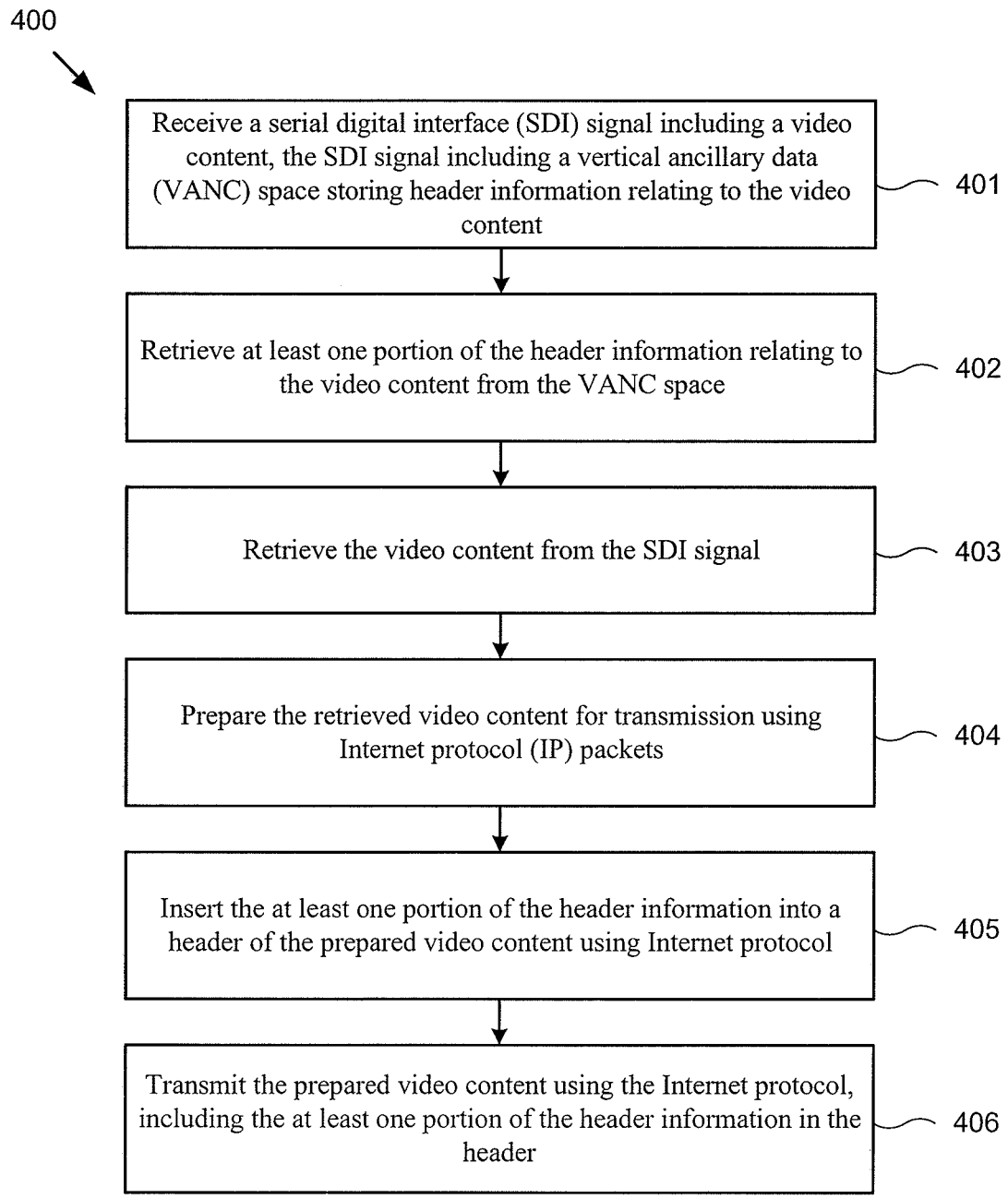
FIG. 4 shows a flowchart illustrating another exemplary method of transporting and retaining video header information for video content, according to one implementation of the present disclosure.

FIG. 4 shows a flowchart illustrating another exemplary method of transporting and retaining video header information for video content, according to one implementation of the present disclosure. Method 400 begins at 401, where executable code 140 receives an SDI signal including video content 101, the SDI signal including a data space, such as a HANC space and/or a VANC space, storing header information 102 relating to video content 101.

At 402, executable code 140 retrieves at least one portion of header information 102 relating to video content 101 from the data space of video content 101 in the SDI format. Header information retrieval module 141 may retrieve at least a portion of the information stored in header information 102. In some implementations, header information retrieval module 141 may retrieve one or more items of header information 102 from data space of video content 101 in the SDI format, such as the source multicast address, the timestamp, the SSRC identifier, the CSRC identifier, etc. Method 400 continues at 403, where executable code 140 retrieves video content 101 from the SDI signal of video content 101 in the SDI format.

At 404, executable code 140 prepares the retrieved video content for transmission using IP packets. In some implementations, video preparation module 143 may prepare video content 101 as an IP video having a header. Method 400 continues at 405, where executable code 140 inserts the at least one portion of the header information into the header of the prepared video content using one of IPv4 and IPv6 Internet protocol. Video preparation module 143 may insert the portions of header information 102 that were retrieved from the data space of video content 101 in the SDI format into the header of video content 101 in the IP format. Inserting part or all of header information 102 into the header of video content 101 in the IP format may preserve header information 102, header information 102 having been transmitted with video content 101 in the SDI format. In some implementations, this may allow video content 101 to be converted form SDI format back into an IP format without losing any of header information 102.

At 406, executable code 140 transmits the prepared video content using the Internet protocol, including the at least one portion of the header information in the header. In some implementations, the prepared video content may be transmitted for display on display 180. For example, computing device may be an IP video device, and the prepared video may be shown on display 120. In other implementations, computing device 110 may be a video conversion device used to prepare the prepared video for use by video device 190, and the prepared video may be transmitted to device 190.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A device comprising:
a non-transitory memory storing an executable code;
a hardware processor executing the executable code to:
receive Internet protocol (IP) packets encapsulating a video content, the IP packets including a frame having a header storing header information relating to the video content;
retrieve at least one portion of the header information relating to the video content from the header;
retrieve the video content from the IP packets;
prepare the retrieved video content for transmission using serial digital interface (SDI) protocol;
insert the at least one portion of the header information into at least one of a vertical ancillary (VANC) data space or a horizontal ancillary (HANC) data space of the prepared video content using the SDI protocol; and
transmit the prepared video content, using the SDI protocol, including the at least one portion of the header information in the at least one of the VANC data space or the HANC data space;
wherein the at least one portion of the header information relating to the video content includes a source multicast address, a timestamp, a synchronization source (SSRC) information and a contributing source (CSRC) information.

2. The device of claim 1, wherein the prepared video content using the SDI protocol, including the at least one portion of the header information in the at least one of the VANC data space or the HANC data space, is transmitted to an IP video device.

3. The device of claim 1, wherein the header is a real-time transport protocol (RTP) header.

4. The device of claim 1, wherein the video content is a multicast video content.

5. The device of claim 4, wherein the multicast video content is received from a plurality of sources.

6. A device comprising:
a non-transitory memory storing an executable code;
a hardware processor executing the executable code to:
receive a serial digital interface (SDI) signal including a video content, the SDI signal having header information relating to the video content stored in a data space of the video content;
retrieve at least one portion of the header information relating to the video content from the data space;
retrieve the video content from the SDI signal;
prepare the retrieved video content for transmission using Internet protocol (IP) packets;
insert the at least one portion of the header information into a header of the IP packets including the prepared video content using; and
transmit IP packets including the prepared video content and the at least one portion of the header information inserted into the header of the IP packets;
wherein the at least one portion of the header information relating to the video content includes a source multicast address, a timestamp, a synchronization source (SSRC) information and a contributing source (CSRC) information.

7. The device of claim 6, wherein the IP packets including the prepared video content and the at least one portion of the header information inserted into the header, are transmitted to an SDI video device.

8. The device of claim 6, wherein the header is a real-time transport protocol (RTP) header.

9. The device of claim 6, wherein the video content is a multicast video content.

10. The device of claim 6, wherein the data space of the received video content includes at least one of a horizontal ancillary (HANC) data space or a vertical ancillary (VANC) data space.

11. A method for use in a system including a first device having a non-transitory memory and a hardware processor, the method comprising:
receiving, using the hardware processor, Internet protocol (IP) packets encapsulating a video content, the IP packets including a frame having a header storing header information relating to the video content;
retrieving, using the hardware processor, at least one portion of the header information relating to the video content from the header;
retrieving, using the hardware processor, the video content from the IP packets;
preparing, using the hardware processor, the retrieved video content for transmission using serial digital interface (SDI) protocol;

inserting, using the hardware processor, the at least one portion of the header information into at least one of a vertical ancillary (VANC) data space of the prepared video content or a horizontal ancillary (HANC) data space of the prepared video using the SDI protocol; and transmitting, using the hardware processor, the prepared video content, using the SDI protocol, including the at least one portion of the header information in the at least one of the VANC data space or the HANC data space;

wherein the at least one portion of the header information relating to the video content includes a source multicast address, a timestamp, a synchronization source (SSRC) information and a contributing source (CSRC) information.

12. The method of claim 11, wherein the transmitting transmits the prepared video content using the SDI protocol, including the at least one portion of the header information in the at least one of the VANC data space or the HANC data space, to an IP video device.

13. The method of claim 11, wherein the system further includes a second device having a second non-transitory memory and a second hardware processor, the method further comprising:

receiving, using the second hardware processor, the prepared video content using the SDI protocol, including the at least one portion of the header information stored in a data space of the prepared video content;

retrieving, using the second hardware processor, at least one portion of the header information relating to the video content from a data space of the prepared video content;

obtaining, using the second hardware processor, the retrieved video content from the SDI signal;

preparing, using the second hardware processor, the obtained video content for transmission using second IP packets;

inserting, using the second hardware processor, the at least one portion of the header information into a header of the obtained video content using the second IP packet; and transmitting, using the second hardware processor, the second IP packets including the obtained video content and the at least one portion of the header information inserted into the header.

14. The method of claim 13, wherein transmitting transmits the second IP packets including the obtained video content and the at least one portion of the header information inserted into the header, to an SDI video device.

15. The method of claim 11, wherein the header is a real-time transport protocol (RTP) header.

16. The method of claim 11, wherein the video content is a multicast video content.

* * * * *